US012645559B2

(12) United States Patent
Hernandez Herranz

(10) Patent No.: US 12,645,559 B2
(45) Date of Patent: Jun. 2, 2026

(54) TECHNIQUES FOR TRACING OPERATIONS IN A NETWORK

(71) Applicant: Telefonaktiebolaget LM Ericsson (publ), Stockholm (SE)

(72) Inventor: Aitor Hernandez Herranz, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 48 days.

(21) Appl. No.: 18/720,480

(22) PCT Filed: Dec. 16, 2021

(86) PCT No.: PCT/SE2021/051274
§ 371 (c)(1),
(2) Date: Jun. 14, 2024

(87) PCT Pub. No.: WO2023/113664
PCT Pub. Date: Jun. 22, 2023

(65) Prior Publication Data
US 2025/0061041 A1 Feb. 20, 2025

(51) Int. Cl.
*G06F 11/34* (2006.01)
*G06F 11/30* (2006.01)
*H04L 69/22* (2022.01)

(52) U.S. Cl.
CPC ...... *G06F 11/3476* (2013.01); *G06F 11/3006* (2013.01); *H04L 69/22* (2013.01); *G06F 2201/835* (2013.01)

(58) Field of Classification Search
CPC ............. G06F 11/3476; G06F 11/3006; G06F 2201/835; H04L 69/22
See application file for complete search history.

(56) References Cited

U.S. PATENT DOCUMENTS 10,742,744 B1 8/2020 Mahalank et al.
11,030,068 B1 6/2021 Agarwal et al.
(Continued)

FOREIGN PATENT DOCUMENTS

WO 2020/087082 A1 4/2020

OTHER PUBLICATIONS

OMA technical specification "Lightweight machine to machine technical specification: Core" version 1.1.1 (Jun. 25, 2019) to Open Mobile Alliance (OMA). ("OMA"). (Year: 2019).*
(Continued)

*Primary Examiner* — June Sison

(74) *Attorney, Agent, or Firm* — Rothwell, Figg, Ernst & Manbeck, P.C.

(57) ABSTRACT

There is provided techniques for tracing operations in a network. A method is performed by a wireless device operatively connected to the network. The method comprises performing an operation with respect to a piece of data. The piece of data is associated with an application run in the network. The method comprises tracing the operation in a trace instance. The trace instance comprises an identifier of a span of the trace instance, an initial timestamp from when the span was originally created, and a reference to another span of the trace instance. The method comprises transmitting a CoAP message to an application server of the application. The CoAP message has a header part and a payload part. The payload part comprises the trace instance.

20 Claims, 7 Drawing Sheets

(56) References Cited

U.S. PATENT DOCUMENTS

| | | | |
|---|---|---|---|
| 2017/0132111 A1* | 5/2017 | Ravindranath Sivalingam ........... | |
| | | | G06F 11/3476 |
| 2019/0007928 A1* | 1/2019 | Di Girolamo ........ | H04W 24/08 |
| 2019/0238617 A1* | 8/2019 | Novo Diaz ......... | H04L 67/1076 |
| 2020/0372007 A1* | 11/2020 | Ross ................... | G06F 11/3476 |
| 2021/0173759 A1 | 6/2021 | Rupp | |
| 2022/0272017 A1* | 8/2022 | Ly ........................... | H04L 67/55 |

OTHER PUBLICATIONS

International Search Report and Written Opinion mailed Aug. 31, 2022 in corresponding International Application No. PCT/SE2021/051274 (11 pages).

* cited by examiner

S202
Obtain trigger request from IoT platform

S204
Provide trigger request to wireless device

S206
Provide observe request to wireless device

S208
Receive CoAP message with tracespan object from wireless device

S210
Transmit trace and span information to tracing collector

TECHNIQUES FOR TRACING OPERATIONS IN A NETWORK

CROSS REFERENCE TO RELATED APPLICATION(S)

This application is a 35 U.S.C. § 371 National Stage of International Patent Application No. PCT/SE2021/051274, filed Dec. 16, 2021, designating the United States.

TECHNICAL FIELD

Embodiments presented herein relate to methods, a wireless device, an application server, computer programs, and a computer program product for tracing operations in a network.

BACKGROUND

Collection and processing of the correct information is of importance in data-driven networks for the given purpose to be accomplished. Tools such as observability, monitoring and optimization can be used for ensuring that the correct information indeed is collected and processed. Such tools can further be used to provide an understanding how applications executed in the network are performed as well as how the network itself is performing. Such tools can further be used to obtain information of how the performance of the applications as well as of the network itself can be improved. In general terms, the observability, monitoring and optimization is based on collecting telemetry data. In this respect, telemetry generally refers to in situ collection of measurements or other data from entities, nodes, and devices in the network and their automatic transmission to receiving equipment for monitoring. Examples of telemetry data are metrics, logs and traces.

One example of data-driven networks where tracing is of use is networks in which Internet-of-Things (IoT) devices, platforms, and applications are deployed. Such networks are hereinafter referred to as IoT networks. However, techniques for collecting telemetry data in, for examples, generic communication networks, are not readily applicable for IoT networks. In fact, it can be challenging to expose the necessary data needed for collecting telemetry data in some networks, such as in IoT networks. This is true since there are not any standardized techniques, or application programming interfaces, APIs, available that can be applied to extract telemetry data in IoT networks.

Hence, there is still a need for techniques enabling tracing of operations performed in networks.

SUMMARY

An object of embodiments herein is to address the above-noted issues.

According to a first aspect there is presented a method for tracing operations in a network. The method is performed by a wireless device operatively connected to the network. The method comprises performing an operation with respect to a piece of data. The piece of data is associated with an application run in the network. The method comprises tracing the operation in a trace instance. The trace instance comprises an identifier of a span of the trace instance, an initial timestamp from when the span was originally created, and a reference to another span of the trace instance. The method comprises transmitting a Constrained Application Protocol (CoAP) message to an application server of the application. The CoAP message has a header part and a payload part. The payload part comprises the trace instance.

According to a second aspect there is presented a wireless device for tracing operations in a network. The wireless device is configured to be the network. The wireless device comprises processing circuitry. The processing circuitry is configured to cause the wireless device to perform an operation with respect to a piece of data. The piece of data is associated with an application run in the network. The processing circuitry is configured to cause the wireless device to trace the operation in a trace instance. The trace instance comprises an identifier of a span of the trace instance, an initial timestamp from when the span was originally created, and a reference to another span of the trace instance. The processing circuitry is configured to cause the wireless device to transmit a CoAP message to an application server of the application. The CoAP message has a header part and a payload part. The payload part comprises the trace instance.

According to a third aspect there is presented a wireless device for tracing operations in a network. The wireless device is configured to be the network. The wireless device comprises an operation module configured to perform an operation with respect to a piece of data. The piece of data is associated with an application run in the network. The wireless device comprises a trace module configured to trace the operation in a trace instance. The trace instance comprises an identifier of a span of the trace instance, an initial timestamp from when the span was originally created, and a reference to another span of the trace instance. The wireless device comprises a transmit module configured to transmit a CoAP message to an application server of the application. The CoAP message has a header part and a payload part. The payload part comprises the trace instance.

According to a fourth aspect there is presented a computer program for tracing operations in a network. The computer program comprises computer code which, when run on processing circuitry of a wireless device is configured to be the network, causes the wireless device to perform actions. One action comprises performing an operation with respect to a piece of data. The piece of data is associated with an application run in the network. One action comprises instantiating a trace instance for tracing the operation in a trace instance. The trace instance comprises an identifier of a span of the trace instance, an initial timestamp from when the span was originally created, and a reference to another span of the trace instance. One action comprises transmitting a CoAP message to an application server of the application. The CoAP message has a header part and a payload part. The payload part comprises the trace instance.

According to a fifth aspect there is presented a method for tracing operations in a network. The method is performed by an application server. The method comprises receiving a CoAP message from a wireless device operatively connected to the network. The CoAP message has a header part and a payload part. The payload part comprises a trace instance. The trace instance traces operations performed by the wireless device with respect to a piece of data. The trace instance comprises an identifier of a span of the trace instance, an initial timestamp from when the span was originally created, and a reference to another span of the trace instance. The method comprises transmitting, to a tracing collector, trace and span information defined by the identifier of the span, the initial timestamp, and the reference.

According to a sixth aspect there is presented an application server for tracing operations in a network. The application server comprises processing circuitry. The processing circuitry is configured to cause the application server to receive a CoAP message from a wireless device operatively connected to the network. The CoAP message has a header part and a payload part. The payload part comprises a trace instance. The trace instance traces operations performed by the wireless device with respect to a piece of data. The trace instance comprises an identifier of a span of the trace instance, an initial timestamp from when the span was originally created, and a reference to another span of the trace instance. The processing circuitry is configured to cause the application server to transmit, to a tracing collector, trace and span information defined by the identifier of the span, the initial timestamp, and the reference.

According to a seventh aspect there is presented an application server for tracing operations in a network. The application server comprises a receive module configured to receive a CoAP message from a wireless device operatively connected to the network. The CoAP message has a header part and a payload part. The payload part comprises a trace instance. The trace instance traces operations performed by the wireless device with respect to a piece of data. The trace instance comprises an identifier of a span of the trace instance, an initial timestamp from when the span was originally created, and a reference to another span of the trace instance. The application server comprises a transmit module configured to transmit, to a tracing collector, trace and span information defined by the identifier of the span, the initial timestamp, and the reference.

According to an eighth aspect there is presented a computer program for tracing operations in a network. The computer program comprises computer code which, when run on processing circuitry of an application server, causes the application server to perform actions. One action comprises receiving a CoAP message from a wireless device operatively connected to the network. The CoAP message has a header part and a payload part. The payload part comprises a trace instance. The trace instance traces operations performed by the wireless device with respect to a piece of data. The trace instance comprises an identifier of a span of the trace instance, an initial timestamp from when the span was originally created, and a reference to another span of the trace instance. One action comprises transmitting, to a tracing collector, trace and span information defined by the identifier of the span, the initial timestamp, and the reference.

According to a ninth aspect there is presented a computer program product comprising a computer program according to at least one of the fourth aspect and the eighth aspect and a computer readable storage medium on which the computer program is stored. The computer readable storage medium could be a non-transitory computer readable storage medium.

Advantageously, these aspects facilitate tracing of operations involving an IoT device.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The wording that a certain data item, piece of information, etc. is obtained by a first device should be construed as that data item or piece of information being retrieved, fetched, received, or otherwise made available to the first device. For example, the data item or piece of information might either be pushed to the first device from a second device or pulled by the first device from a second device. Further, in order for the first device to obtain the data item or piece of information, the first device might be configured to perform a series of operations, possibly including interaction with the second device. Such operations, or interactions, might involve a message exchange comprising any of a request message for the data item or piece of information, a response message comprising the data item or piece of information, and an acknowledge message of the data item or piece of information. The request message might be omitted if the data item or piece of information is neither explicitly nor implicitly requested by the first device.

The wording that a certain data item, piece of information, etc. is provided by a first device to a second device should be construed as that data item or piece of information being sent or otherwise made available to the second device by the first device. For example, the data item or piece of information might either be pushed to the second device from the first device or pulled by the second device from the first device. Further, in order for the first device to provide the data item or piece of information to the second device, the first device and the second device might be configured to perform a series of operations in order to interact with each other. Such operations, or interaction, might involve a message exchange comprising any of a request message for the data item or piece of information, a response message comprising the data item or piece of information, and an acknowledge message of the data item or piece of information. The request message might be omitted if the data item or piece of information is neither explicitly nor implicitly requested by the second device.

Figure 1:
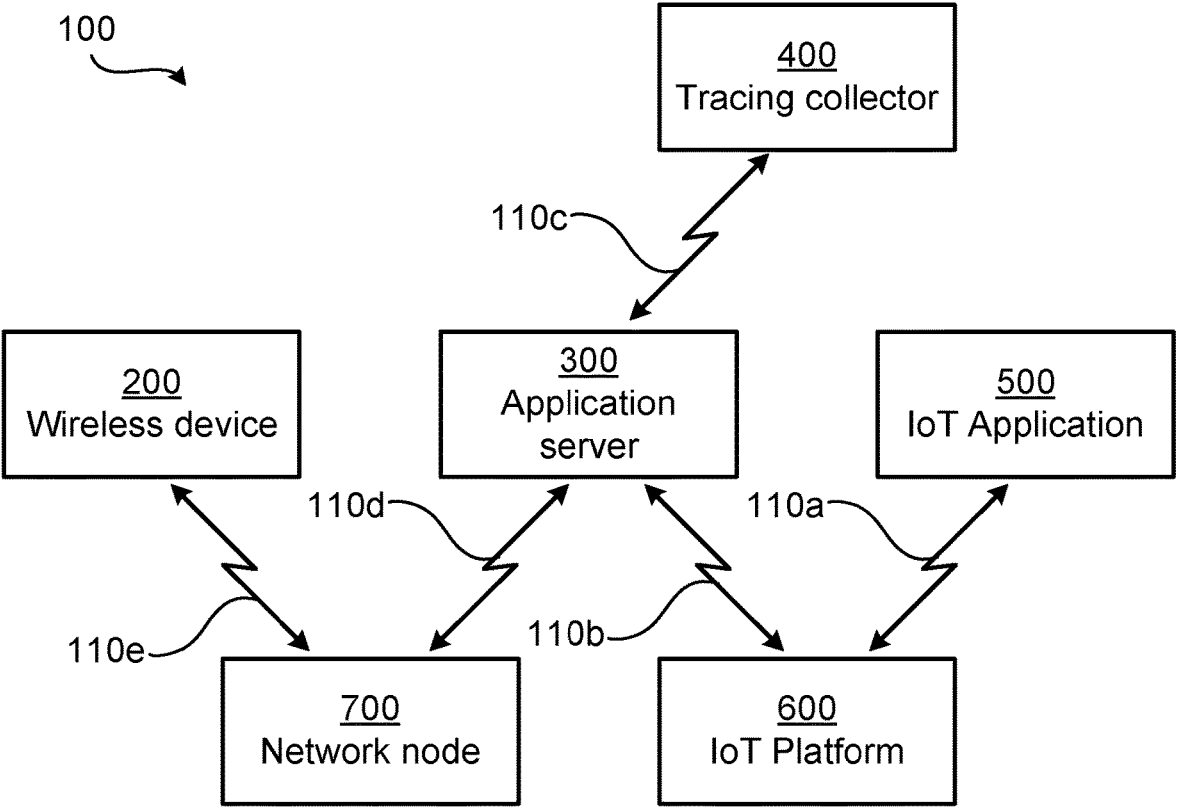
FIG. 1 is a schematic diagram illustrating a network according to embodiments.

FIG. 1 is a schematic diagram illustrating a network 100 where embodiments presented herein can be applied. The network 100 comprises entities in terms of a wireless device 200, an application server 300, a tracing collector 400, an IoT application entity 500, an IoT platform 600, and a network node 700. The entities 200:700 are configured to communicate with each other over links 110a: 110e. That is, all communication between the IoT application entity 500 and the application server 300 occurs over links 110a and 110b and hence via the IoT platform 600, and so on. The IoT application entity 500 might be implemented in a user equipment, such as a desktop computer, a laptop computer, a tablet computer, or a smartphone. Alternatively, the IoT application entity 500 is implemented in an industrial control system, or the like. The wireless device 200 might be an IoT device. In general terms, the IoT platform 600 is the software entity responsible to facilitate the communication between wireless devices 200 and data exposure used by IoT applications, as represented by the IoT application entity 500. The functionality of the IoT platform 600 might be decomposed into elements, such as device and data management, analytics or application development. Further, the application server 300 can be implemented to be part of the IoT platform 600.

As disclosed above, there is still a need for techniques enabling tracing of operations performed in networks 100.

Device management systems based on, for example, communication between entities in the network 100 by means of the Lightweight Machine-to-Machine (LwM2M) protocol do not provide a straight-forward way to expose telemetry data as part of the Internet Protocol for Smart Objects (IPSO) data model. While the object Event Log, as defined in the IPSO data model, could be used for that purpose, it is too general and it complicates the LwM2M client implementation to collect and parse the telemetry data into existing known formats.

The herein disclosed inventive concept therefore aims at extending the observability of traces to wireless devices, such as constrained devices using Constrained Application Protocol (CoAP) signalling and LWM2M signalling for communication, and by enhancing the IPSO data model. With that, observability of operations performed with respect to data in the network, applications executed by entities in the network, as well as the network itself, is provided. This is achieved by means of using trace instances. A trace instance could for example be an instantiation of a LwM2M object.

The embodiments disclosed herein in particular relate to techniques for tracing operations in a network 100. In order to obtain such techniques there is provided a wireless device 200, a method performed by the wireless device 200, a computer program product comprising code, for example in the form of a computer program, that when run on processing circuitry of the wireless device 200, causes the wireless device 200 to perform the method. In order to obtain such techniques there is further provided an application server

300, a method performed by the application server 300, and a computer program product comprising code, for example in the form of a computer program, that when run on processing circuitry of the application server 300, causes the application server 300 to perform the method.

Figure 2:
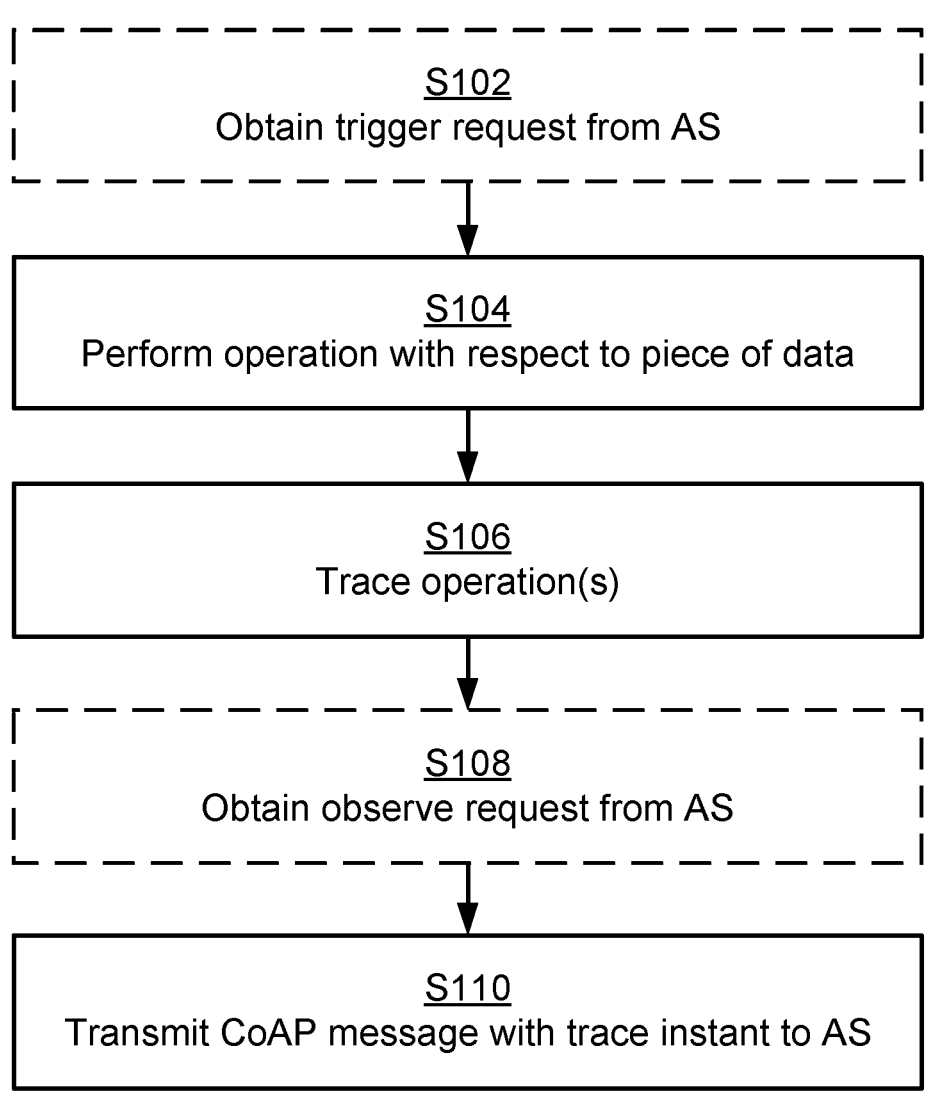
FIGS. 2 and 3 are flowcharts of methods according to embodiments.

Reference is now made to FIG. 2 illustrating a method for tracing operations in a network 100 as performed by the wireless device 200 operatively connected to the network 100 according to an embodiment.

S104: The wireless device 200 performs an operation with respect to a piece of data. The piece of data is associated with an application run in the network 100. In this respect, the operation could pertain to collecting the piece of data (e.g., when the piece of data represents a sensor reading, an image from a surveillance camera, or the like). Likewise, the operation could pertain to processing the piece of data, for example to extract some property from the piece of data, to filter the piece of data, to analyze the piece of data, to transform the piece of data, etc. The operation could pertain to receiving the piece of data from another entity or to transmitting the piece of data towards another entity.

S106: The wireless device 200 traces the operation in a trace instance. The trace instance comprises an identifier of a span of the trace instance, an initial timestamp from when the span was originally created, and a reference to another span of the trace instance. In this respect, the reference to another span of the trace instance could be empty if the instantiation of the trace instance is triggered by the wireless device 200 itself. Further in this respect, the trace instance itself might be instantiated prior to step S104 in order for the operation performed in S104 to be traced. Still further in this respect, it is not until the operation in S104 is triggered that the identifier of the span is available, which makes it possible to instantiate the trace instance. Thus, the operation as performed in S104 might have been triggered but not finished when S106 is executed. Therefore, steps S104 and S106 might be performed in parallel.

Figure 4:
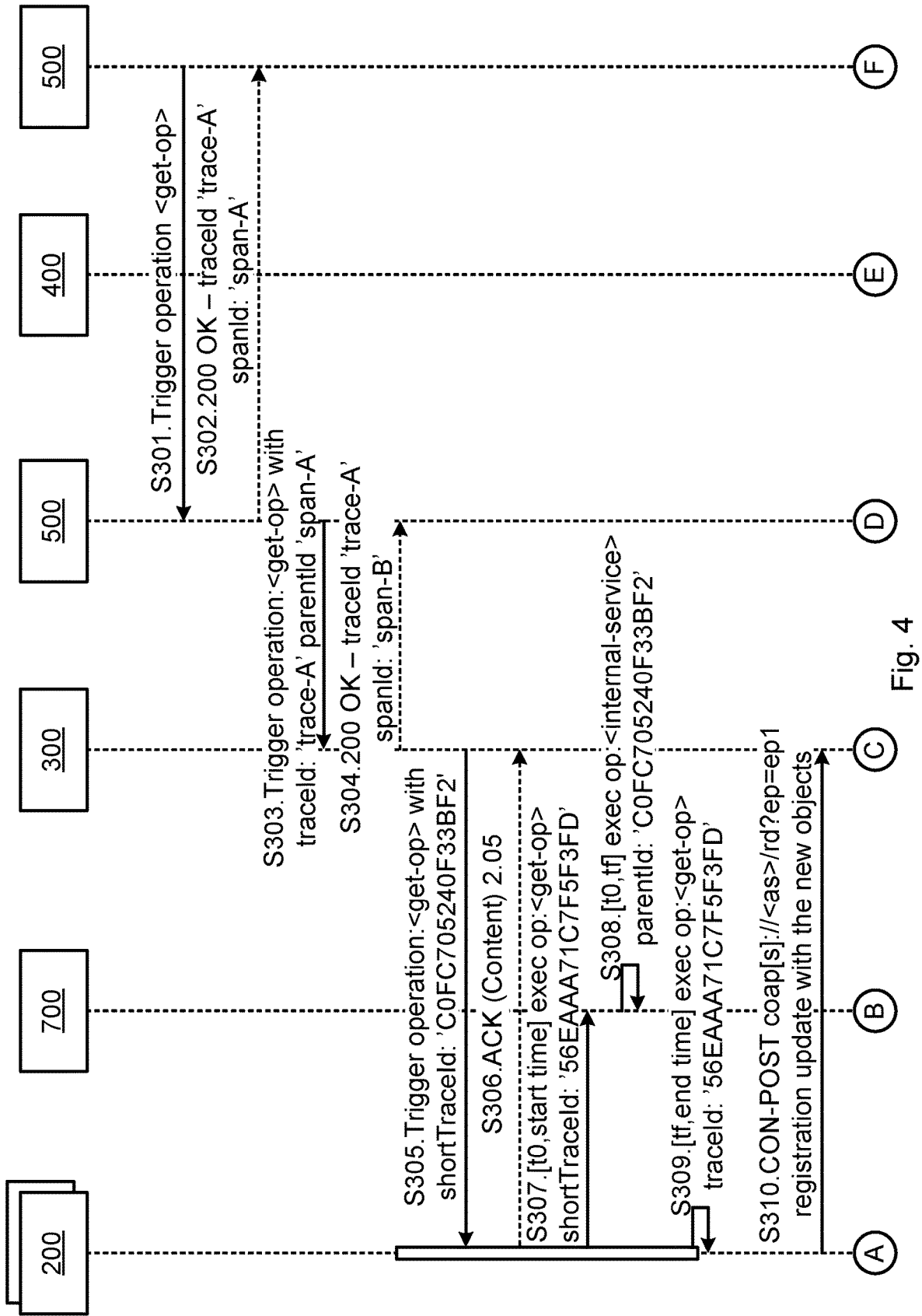
FIG. 4 is a signalling diagram according to embodiments.
Figure 4:
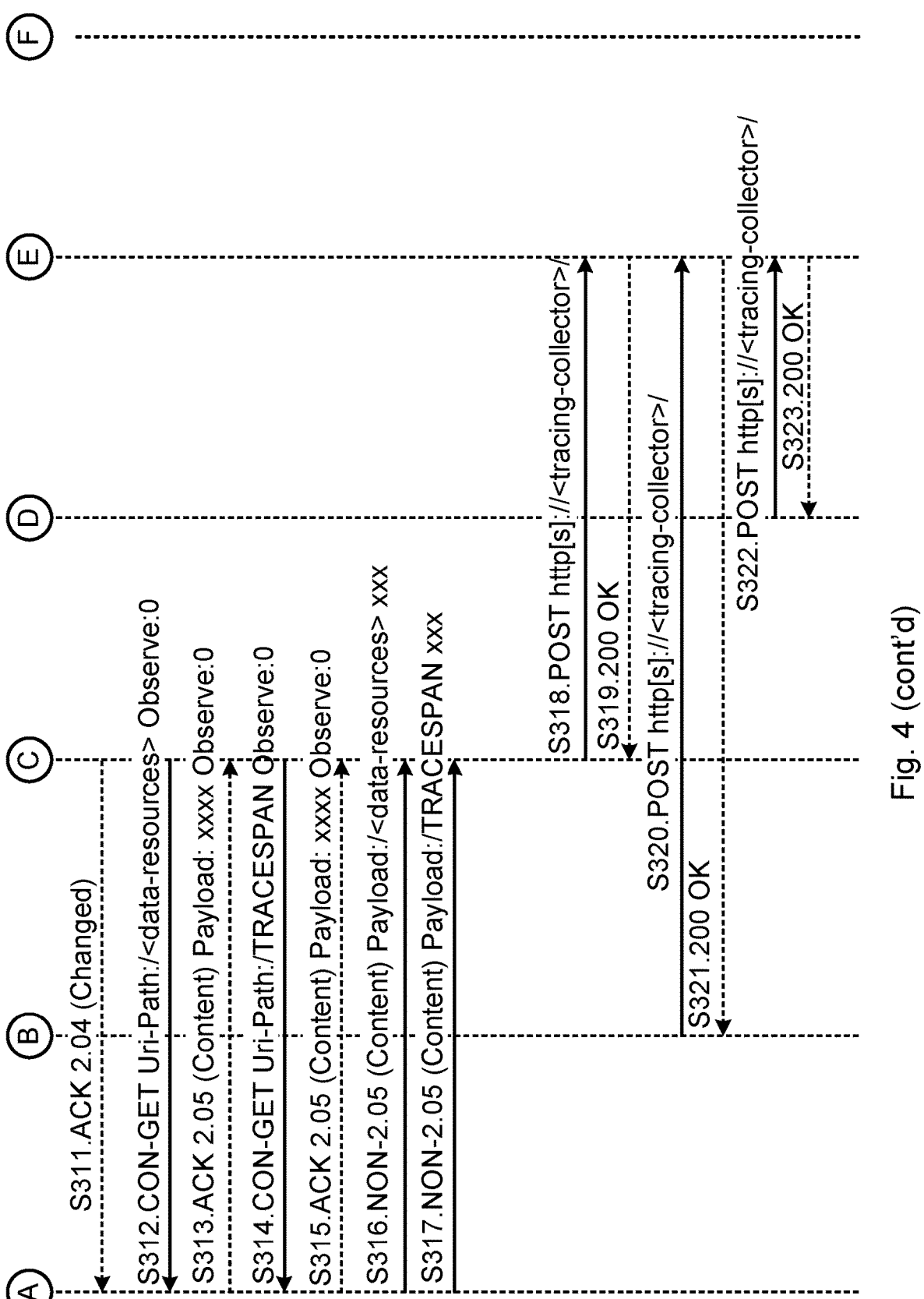

The wireless device 200 could further trace one or more further operations in one or more further trace instances, for example as shown in step S308 of FIG. 4.

S110: The wireless device 200 transmits a CoAP message to an application server 300 of the application. The CoAP message has a header part and a payload part. The payload part comprises the trace instance. In some examples, a final timestamp, for example the below mentioned EndTimestamp, of the trace instance is provided in the trace instance. As will be disclosed below, the application server 300 transmits, to a tracing collector 400, trace and span information defined by the identifier of the span, the initial timestamp, and the reference to another span. In some examples, the trace and span information is only sent upon the final timestamp of the trace instance being provided in the trace instance.

In case the wireless device 200 has traced more than one operation, more than one trace instance could be included in the payload of the CoAP message.

This method provides a simple way to expose the traces from constrained wireless devices 200 and can be integrated with existing distributed tracing mechanisms.

Embodiments relating to further details of tracing operations in a network 100 as performed by the wireless device 200 will now be disclosed.

There may be different ways to define the trace instance. In some embodiments, the trace instance is an IPSO object. In some non-limiting examples, the IPSO object is an LwM2M object and has the following structure:

| OBJECT: LwM2M TraceSpan | | |
| --- | --- | --- |
| +−ro− | Span* [instance__number] | |
| +−rw− | instance__number | integer |
| +−r−− | SpanId | string |
| +−r−− | OperationName | string |
| +−r−− | SpanTags | string [optional] |
| +−r−− | InitTimestamp | integer |
| +−r−− | EndTimestamp | integer |
| +−r−− | BaggageItem | string [optional] |
| +−r−− | ChildOf | obj-link/string [optional] |
| +−r−− | FollowsFrom | obj-link/string [optional] |
| +−−−x | SpanStart | integer |
| +−−−x | SpanStop | |
| +−r−− | Status | |

Here, r = read, ro = read only, rw = read/write, and x = execute.

The definitions of the parameters SpanContext, OperationName, SpanTags, InitTimestap, EndTimestamp, BaggageItems and references ChildOf and FollowsFrom follow from the OpenTracing specification, for example as available at https://opentracing.io/specification/as per 6 Dec. 2021. In this respect, a generalization for the references (i.e., ChildOf or FollowsFrom) is to specify ParentId. Hence, ParentId could be used instead of ChildOf or FollowsFrom. The parameters SpanStart, SpanStop and Status represent resources used to enable or disable the tracing mechanisms. This enables, for example, the application server to enable tracing on demand. The enabling of tracing could be triggered by a monitoring tool that raise different alerts, which require more details from tracing to be able to provide an action or correction to the network 100. Further, the enabling of the tracing might be part of configuration of the wireless device 200.

In general terms, a trace describes the semantics of operations performed with respect to data in the network 100, where a trace represents one trace instance or more than one trace instances that are related, e.g. relate to the same original request for an operation (such as original request S301 of FIG. 4). The trace might be provided as a directed acyclic graph (DAG) of spans. There is no restriction on where the spans are executed or belong to. Hence, in some embodiments, the trace is defined by a DAG of the span and the aforementioned another span. A representation of a span is referred to as a trace instance.

With respect to spans, each span might comprise at least some of the following parameters:

Operation name: A human-readable string that represents the operations performed with respect to the piece of data for the span.

SpanContext/SpanId: A unique reference to a concrete span. This might be injected into, and extracted from, a given carrier, such as Hypertext Transfer Protocol (HTTP) headers, CoAP headers, etc. The SpanId could be used as the above-mentioned identifier of the span of the trace instance.

Tags or Labels: Identifiers usable to classify the span.

InitTimestamp: Initial timestamp defining the point in time when the span was originally created.

EndTimestamp: Final timestamp defining the point in time when the span was terminated. The end timestamp can also be defined as a duration having the initTimestamp as reference.

Annotations: Provides information usable to annotate specific events that occur during the lifespan of the span.

Baggage: Other data that should be transported in-band along with the SpanContext.

Link: Reference to another span(s). The Link could be used as the above-mentioned reference to another span of the trace instance. The Link parameter could be any of:

ChildOf: Used when the given span is part of another span,

FollowsFrom: Used when the given span is the continuation of another span.

Further, as disclosed above, the parameter ParentId can be used as a generalization for the references (i.e., ParentId can be used instead of ChildOf or FollowsFrom). Similarly, the parameter SpanId can be used as the identifier of the trace instance.

The identifier of a trace (such as TraceId) is typically an identifier of the top level span of the trace. When there is no reference to another span, i.e. when the trigger request is sent from the entity from which the trace originates, the SpanId is also the TraceId.

In some aspects, the wireless device 200 is triggered by the application server 300 to start collecting data (or to perform any other type of operation on the piece of data) and to start the tracing. In turn, and as will be further disclosed below, the application server 300 might be triggered by a yet further device to start the tracing.

In yet further aspects, the trigger request originates from the network node 700 and is thus not first passed through the application server 300. In some embodiments, the wireless device 200 is configured to perform (optional) step S102:

S102: The wireless device 200 obtains a trigger request. The trigger request might be obtained from the application server 300 via the network node 700. Alternatively, the trigger request originates from the network node 700. The trigger request indicates to the wireless device 200 to start performing the operation with respect to the piece of data. The trigger request could be received in a CoAP message from the application server 300 via the network node 700.

In some aspects, the trigger request comprises a token. In particular, in some embodiments, the trigger request comprises a header, and wherein the header comprises a token.

There could be different such tokens. Aspects relating thereto will be disclosed next. In some embodiments, the token comprises an identifier of the trace instance (such as SpanId). In some examples, the token comprises an identifier (such as SpanId) of the trace instance and the reference (such as ParentId) to the aforementioned another span. In some embodiments, the token is transmitted back to the application server 300 as part of the trace instance. The Token as provided in CoAP messages could be used as SpanId. In some aspects, the wireless device 200 uses the token as reference for any new spans coming from the same request. In particular, in some embodiments, the token is used as a reference for any new span relating to the request. In this way, SpanId can be used as ParentId for any following request.

In some aspects, the trace instance is provided in the CoAP message in S110 in response to the wireless device 200 having received an observe request from the application server 300. That is, in some embodiments, the wireless device 200 is configured to perform (optional) step S108:

S108: The wireless device 200 obtains an observe request from the application server 300. The observe request indicates to the wireless device 200 to include the trace instance in the CoAP message.

Figure 3:
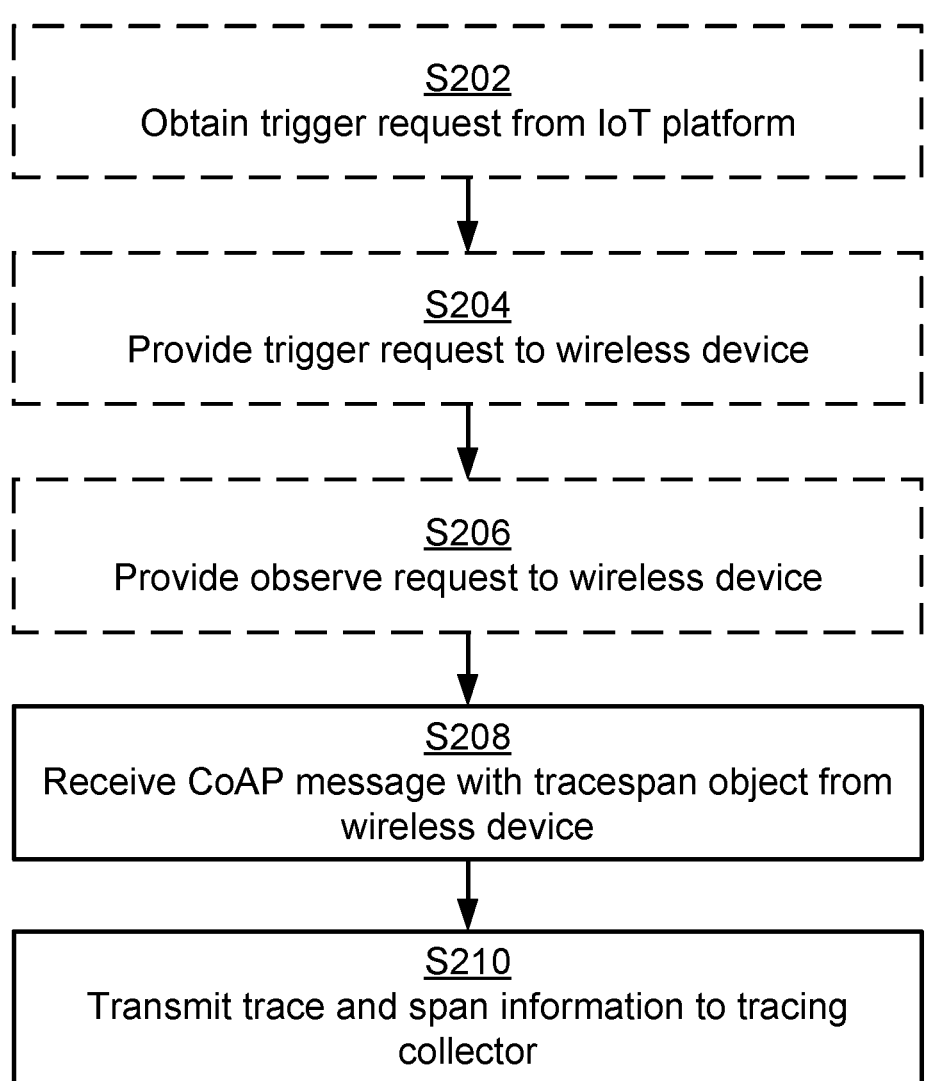

Reference is now made to FIG. 3, illustrating a method for tracing operations in a network 100 as performed by the application server 300 according to an embodiment.

S208: The application server 300 receives a CoAP message from the wireless device 200. The wireless device 200 is operatively connected to the network 100. The CoAP message has a header part and a payload part. The payload part comprises a trace instance for tracing operations performed by the wireless device 200 with respect to a piece of data. The trace instance comprises an identifier of a span of the trace instance, an initial timestamp from when the span was originally created, and a reference to another span of the trace instance.

S210: The application server 300 transmits trace and span information defined by the identifier of the span, the initial timestamp, and the reference to a tracing collector 400. In some examples, the trace and span information is only sent upon a final timestamp of the trace instance being provided in the trace instance (as obtained in S208).

Embodiments relating to further details of tracing operations in a network 100 as performed by the application server 300 will now be disclosed.

In some aspects, the wireless device 200 is, via the application server 300, triggered by another entity, such as the IoT platform 600, to start collecting data (or to perform any other type of operation on the piece of data) and to start the tracing. Therefore, in some embodiments, the application server 300 is configured to perform (optional) step S202:

S202: The application server 300 obtains the trigger request from another entity, e.g. from an IoT platform 600.

The trigger request in S202 might be obtained in an HTTP message, such as an HTTP request message. The HTTP request message might comprise a SpanId and a reference to a TraceId. In such a case, the TraceId provided by the IoT platform 600 will typically be the top-level entity from where all the other spans are going to relate. Once having obtained the trigger request in S202, this might in turn trigger the application server 300 to provide a corresponding trigger request to the wireless device 200. That is, in some embodiments, the application server 300 is configured to perform (optional) step S204:

S204: The application server 300 provides a trigger request to the wireless device 200. The trigger request indicates to the wireless device 200 to start performing an operation with respect to the piece of data. The trigger request could be transmitted in a CoAP message to the wireless device 200.

This trigger request is obtained by the wireless device 200 as in (optional) step S102. Hence, the embodiments, aspects, and examples disclosed above with respect to this trigger request apply also to the application server 300. As disclosed above, in some embodiments, the trigger request comprises a header, and the header comprises a token. The token comprises an identifier of the trace instance (such as SpanId). In some embodiments, the token comprises the identifier (such as SpanId) of the span and the reference (such as ParentId) to the aforementioned another span. As disclosed above, in some embodiments, the token is received back from the wireless device 200 as part of the trace instance.

As disclosed above, in some aspects, the trace instance is provided in the CoAP message in S110 in response to the wireless device 200 having received an observe request from the application server 300. Therefore, in some embodiments, the application server 300 is configured to perform (optional) step S206:

S206: The application server 300 provides an observe request to the wireless device 200. The observe request indicates to the wireless device 200 to include the trace instance in the CoAP message.

According to a first example, the token is random-valued and the application server 300 keeps a table with the mapping between the token and one or more of the following identities: (TraceId, ParentId, newSpanId). The application server 300 needs to apply the mapping table before transmitting the trace and span information to the tracing collector 400. According to a second example, the token is created to include one or more relevant identities. For example, the token could be created to include the identity of the span and the identity of the other span, for example the (parentId, newSpanId) tuple, or the token could be created to also include traceId, and thus to include the (parentId, newSpanId, traceId) tuple. That is, the token can be created according to a function, $f$, such that: token=$f$(parentId, newSpanId, traceId), where traceId is optional and where there exists an inverse function g=$f^{-1}$, where the function g is used to extract the parentId and newSpanId (and traceId, when included) from the token. The application server 300 thus needs to apply the function g (token) to extract the parentId and the newSpanId (and traceId, when included) of the trace instance before transmitting the trace and span information to the tracing collector 400. In some examples, the newSpanId is randomly generated, and the token is generated from a bit operation function $f$ which combines the parentId and the newSpanID into a token in a predetermined manner. For example, if n bytes are used to represent the token, then the upper n/2 bytes can be used to represent the parentId, and the lower n/2 bytes used to represent the newSpanId, or vice versa. A receiver of the token (such as the application server 300 or any other CoAP device) could then extract the parentId and the newSpanId by applying the corresponding inverse function g, comprising a bit mask and a bit shift operation, on the token. In some implementations, the receiver will only extract the newSpanId.

Other examples of bit operation functions could alternatively be used to create the token, with corresponding inverse functions. For example, in one example, the newSpanId occupies the middle bytes of the token, while the parentId occupies the uppermost and lowermost bytes, or vice versa. This could be generalized to also include the traceId by, for example, dividing the n bits of the token in three parts; one part for the parentId, one part for the newSpanId, and one part for the traceId.

A short non-limiting illustrative example, in pseudo-code for calculating the value of token from parentId and newSpanId, follows next, where the token comprises 8 bytes, and parentId (known) and newSpanId (randomly generated) is represented by 4 bytes each, In this example, the parentId occupies the 4 upper bytes. Assume that parentId and newSpanId take the following values:

uint16_t parentId=0x1122;
uint16_t newSpanId=0x5566;
The token can then be calculated as follows:
uint32_t token=(parentId & 0xFFFF)<<16|(newSpanId & 0xFFFF);
The token is thus, in this example, encoded into 8 bytes (32 bits), the maximum token length in CoAP.

The receiver, as applying the inverse function g, can then apply a bit mask and a bit shift operation on the received value of token. Continuing the above example, at the receiving end, the values of parentId and newSpanId can thus be extracted from the received token as follows:

uint16_t parentId=(token>>16) & 0xFFFF=0x1122;
uint16_t newSpanId=(token & 0xFFFF)=0x5566.
Other functions $f$ for generating the token could alternatively be used, for example a linear function that is known by both the wireless device and the receiver.

One particular embodiment for tracing operations in a network 100 based on at least some of the above disclosed embodiments will now be disclosed in detail with reference to the signalling diagram of FIG. 4. In FIG. 4 is illustrated an example where the tracing is originating at the IoT entity application (steps S301, S302). However, the signalling in FIG. 4 might also represent examples where the tracing is originating from the IoT platform (steps S303, S304) by skipping steps S301, S302, or from the application server (steps S305, S306) by skipping steps S301-S304, or from the wireless device itself (steps S307, S309) by skipping steps S301-S306, S308, or from the network node (step S308) by skipping steps S301-S307. In some examples, the steps in FIG. 4 are preceded by an LwM2M registration process of the wireless device.

S301: A trigger is originated by an IoT entity application using the northbound APIs of the IoT platform.

S302: Given that the IoT platform has support for tracing, it provides a trace of the API call from the IoT application entity and assigns a new TraceId "trace-A" and SpanId "span-A". The TraceId and the SpanId are returned in the API call (and inserted in the request that is forwarded towards the application server) as in Tableaux 1:

TABLE 1

| |
|---|
| Int: IoT app –> IoT platform |
| Req: GET http[s]://[iot-platform]/ |
| Res: 200 OK |
|     Headers: {"TraceId": "trace-A", "SpanId": "span-A"} |

Tableaux 1

S303: The IoT platform forwards the request to an application server using LwM2M or HTTP signalling.

S304: Given that the AS has support for tracing on its northbound API, it provides a trace of the API call and assigns a new SpanId, keeps the TraceId reference, and moves the received SpanId to ParentId (to be used as reference) as in Tableaux 2:

TABLE 2

| |
|---|
| Int: IoT platform –> AS |
| Req: POST http[s]://[application-server-lwm2m]/api/ |
| devices/<endpoint-1>/<object-op> |
| Res: 200 OK |
|     Headers: {"TraceId": "trace-A", "SpanId": "span-B", |
|     "ParentId": "span-A"} |

S305: When an operation, as given by the trigger in step S301 is requested, the application server sends a request towards the wireless devices using CoAP signalling.

For CoAP, when using the headers to carry information, there is a limitation to the 0-8 bytes in the token header. The application server keeps track of the tuple (TraceId, ParentId) with the token to simplify its processing during the collection of traces (steps S318-S323). In one alternative the token is formed to hold the information of the TraceId and the ParentId, taking into consideration the bytes size limitation. Table 1 provides a mapping for TraceId and ParentId. Alternatively, 56EAAA71C7F5F3FD could be defined as token=ƒ(parentId, newId), where the inverse is defined as parentId=g (token), to be able to have the knowledge of the parentId across other device originated calls.

TABLE 1

| Token (8 bytes) | TraceId | ParentId |
|---|---|---|
| C0FC705240F33BF2 (step S305) | Trace-A | Span-B |
| 56EAAA71C7F5F3FD (step S307) | Trace-A | C0FC705240F33BF2 |

S306: The interaction between the application server and the wireless device proceeds as in Tableaux 3, for example when data is requested by the application server from the wireless device:

TABLE 3

| |
|---|
| Interaction: AS –> Devices |
| Request: CON-POST coap[s]://[endpoint-1]/<object-op> |
| Token: C0FC705240F33BF2 |
| Response: 2.05 ACK |
|     Header: Token C0FC705240F33BF2 |

S307: The wireless device uses the token as the reference for new spans coming from the same request. It will be reference as "ChildOf" or "FollowFrom" reference types. At this point, a new instance of the trace instance will be created. For example, /xyz/i/, with the following content:

SpanContext: 56EAAA71C7F5F3FD

OperationName: "get-op"

SpanTags: ep=endpoint–1

InitTimestamp: to

FollowsFrom (or ParentID): C0FC705240F33BF2

The wireless device needs external resources to finalize "get-op". This will be illustrated by way of example with a network node in the user plane (such as a packet gateway (PGW)) taking part in the distributed tracing. For example, the request could be another CoAP message. The network node will extract the SpanContext (Token) from the request and use it as its own "parentId". With that, it is possible to trace back and reference all the spans in the same TraceId.

In the example of Tableaux 4, wireless device "ep1" contacts wireless device "ep2" with the token. In this case wireless device "ep2" could continue its functionality and use 56EAAA71C7F5F3FD as the ParentId for subsequent traces.

TABLE 4

| |
|---|
| Int: Devices (ep1) –> Devices (ep2) |
| Req: CON-GET coap[s]://[endpoint-2]/<object-op> |
| Token: 56EAAA71C7F5F3FD |
| Res: 2.05 ACK |
|     Header: Token 56EAAA71C7F5F3FD |

S308: Any intermediate network node, with the capability to analyze the headers of the packets, could extract the Token from the CoAP Header and use it to further provide its internal traces. Any such intermediate network node will use the previous SpanContext (the token in case of CoAP) as ParentId in their related traces, or to specify the type of relation ChildOf or FollowsOf.

S309: The response from wireless device "ep2" is received by wireless device "ep1".

S310, S311: Since the wireless device has created a new trace instance (/xyx/i/), the wireless device needs to send the updates to the application server. For that, several options are possible:

A first option involves LwM2M re-registration, where the wireless device is registered again providing all the information of the objects and trace instances is available. This procedure involves two message exchanges with the application server: 1) De-registration (wireless device->application server); 2) Registration (wireless device->application server).

A second option involves an LwM2M registration update, where the wireless device uses a periodic registration update to notify the application server of the new objects and trace instances created. This second option is illustrated in FIG. 4.

S312, S313: The observe request is sent from the application server towards the wireless device to receive notifications on <data-resources> changes. This step could have been executed before S301. A read operation can be used if the trace instance is only created when both initTimestamp and endTimestamp are filled.

S314, S315: An observe request is sent from the application server towards the wireless device(s) to receive notifications on changes to the trace instances.

S316: A notification is sent from the wireless device towards the application server that will trigger other computations in the IoT platform.

S317: A notification of all the changes in the trace instance objects are sent from the wireless device towards the application server. This notification might serve as a trigger for the application server to transmit the traces to the tracing collector, as in S318. Further, the application server might, before transmitting the traces, combine all its own traces and spans for a given time period together with the traces and spans received in the trace instance object. The application server thus generates a report to be sent to the tracing collector.

S318: The application server transmits the traces to the tracing collector. The application server thus sends all the spans and trace information to the tracing collector. The trace instance(s) can be removed at this stage. In some examples, the spans and trace information is sent only upon the tracing collector having requested the application server to do so. In other examples, the application server sends the spans and trace information without first having been requested by the tracing collector to do so.

S319: The exchange of request and response messages between the application server and the tracing collector might occur as in Tableaux 5:

TABLE 5

```
Int: AS -> TC
Req: POST http[s]://[tracing-collector]/
- Payload:
  [
    {
      "traceId": "trace-A",
      "parentId": "span-B",
      "operationName": "get-op",
      "spanId": "C0FC705240F33BF2",
      "initTimestamp": 1458702548467000,
      "endTimestamp": 1458702548500000,
      "spanTags": {"target": "endpoint-1", "source": "as"},
    },
    {
      "traceId": "trace-A",
      "parentId": "C0FC705240F33BF2",
      "operationName": "get-op",
      "spanId": "56EAAA71C7F5F3FD",
      "initTimestamp": 1458702548520000,
      "endTimestamp": 1458702548700000,
      "spanTags": {"target": "endpoint-2", "source":
      "endpoint-1"}
    }
  ]
Res: 200 OK
```

S320, S321: The exchange of request and response messages between the network node and the tracing collector might occur as in Tableaux 6:

TABLE 6

```
Int: NN -> TC
Req: POST http[s]://[tracing-collector]/
- Payload:
  [
    {
      "parentId": "56EAAA71C7F5F3FD",
      "operationName": "internal-service",
      "spanId": "0CCCA7493877CF8D",
      "initTimestamp": 1458702548550000,
      "endTimestamp": 14587025486900000,
      "spanTags": {"target": "endpoint-1",
      "source": "as", observer: "nn"}
    }
  ]
Res: 200 OK
```

When the network node provide information to the tracing collection, the network node does not have any reference to the traceId (unless token=$f$(traceId, parentId), and parentId=$g$(token), where $g=f^{-1}$. Therefore, the tracing collector might be configured to perform this mapping by using the "parentId" reference.

S322, S323: The exchange of request and response messages between the IoT application entity and the tracing collector might occur as in Tableaux 7:10

TABLE 7

```
Int: IoTP -> TC
Req: POST http[s]://[tracing-collector]/
- Payload:
  [
    {
      "traceId": "trace-A",
      "operationName": "get-op",
      "spanId": "span-A",
      "initTimestamp": 1458702548000000 ,
      "endTimestamp": 1458702548200000 ,
      "spanTags": {"target": "iotp", "source": "iotapp"}
    },
    {
      "traceId": "trace-A",
      "parentId": "span-A",
      "operationName": "get-op",
      "spanId": "span-B",
      "initTimestamp": 1458702548250000 ,
      "endTimestamp": 1458702548400000 ,
      "spanTags": {"target": "iotp", "source": "iotapp"}
    }
  ]
Res: 200 OK
```

The herein disclosed embodiments for tracing operations in a network 100 are applicable in different types of scenarios where operations are performed with respect to pieces of data. Some non-limiting examples of such scenarios will be disclosed next.

A first group of scenarios relates to tracing latency in the network 100. Such latency could be considered in terms of latency of API calls, protocol-caused latency, and/or execution time for algorithms used for the operations performed with respect to pieces of data in the network 100.

A second group of scenarios relates to tracing dependencies in the network 100. Such dependencies could be considered in terms of dependencies between components, entities, nodes, devices, etc. in the network 100, and/or dependencies between API calls or specific protocol calls for communication between entities, nodes, devices, etc. in the network 100 and/or for performing operations with respect to pieces of data in the network 100.

A third group of scenarios relates to tracing changes to the network 100. Such changes could be considered in terms of self-adaptability of algorithms executed by entities, nodes, devices, etc. in the network 100, allowing the flexibility to higher level orchestrators to decide if the algorithms should be migrated to other entities, nodes, or devices, etc. in the network 100. Such changes could further be considered in terms of re-configuration of application executed in the network 100, for example tracing changes in the applications to optimize the functionality. Such changes could further be considered in terms of optimizing network usage, identifying time intervals when pieces of data are to be sent and processed somewhere else, as well as identifying time intervals when pieces of data are to be processed locally, for example based on protocol latency and the algorithms execution time on the different entities, nodes, devices, etc. in the network 100. Such changes could further be considered in terms of changing network configurations, based on requirements of the application executed in the network 100. Such changes could further be considered in terms of identifying entities, nodes, devices, etc. in the network 100, and/or parts of the network 100 that are not performing as expected.

Figure 5:
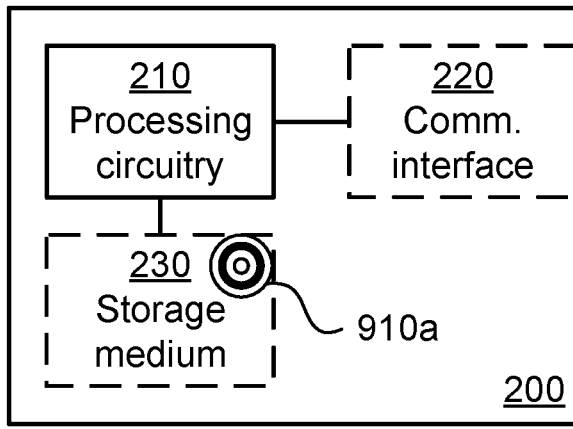
FIG. 5 is a schematic diagram showing functional units of a wireless device according to an embodiment.

FIG. 5 schematically illustrates, in terms of a number of functional units, the components of a wireless device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910a (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the wireless device 200 to perform a set of operations, or steps, as disclosed above. For example, the storage medium 230 may store the set of operations, and processing circuitry 210 may be configured to retrieve the set of operations from the storage medium 230 to cause wireless device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The wireless device 200 may further comprise a communications interface 220 for communications with other entities, functions, nodes, and devices, as in FIG. 1. As such the communications interface 220 may comprise one or more transmitters and receivers, comprising analogue and digital components.

The processing circuitry 210 controls the general operation of the wireless device 200 e.g. by sending data and control signals to the communications interface 220 and the storage medium 230, by receiving data and reports from the communications interface 220, and by retrieving data and instructions from the storage medium 230. Other components, as well as the related functionality, of the wireless device 200 are omitted in order not to obscure the concepts presented herein.

Figure 6:
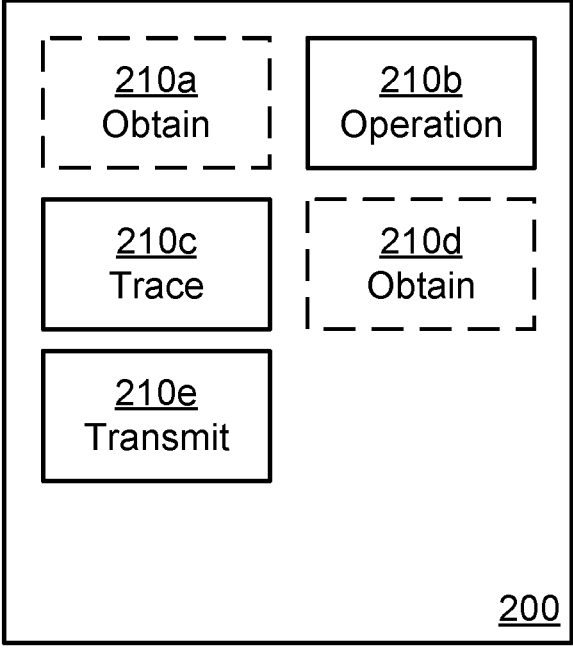
FIG. 6 is a schematic diagram showing functional modules of a wireless device according to an embodiment.

FIG. 6 schematically illustrates, in terms of a number of functional modules, the components of a wireless device 200 according to an embodiment. The wireless device 200 of FIG. 6 comprises a number of functional modules; an operation module 210b configured to perform step S104, a trace module 210c configured to perform step S106, and a transmit module 210e configured to perform step S110. The wireless device 200 of FIG. 6 may further comprise a number of optional functional modules, such as any of a first obtain module 210a configured to perform step S102 and a second obtain module 210d configured to perform step S108. In general terms, each functional module 210a: 210e may be implemented in hardware or in software. Preferably, one or more or all functional modules 210a: 210e may be implemented by the processing circuitry 210, possibly in cooperation with the communications interface 220 and/or the storage medium 230. The processing circuitry 210 may thus be arranged to from the storage medium 230 fetch instructions as provided by a functional module 210a: 210e and to execute these instructions, thereby performing any steps of the wireless device 200 as disclosed herein.

Figure 7:
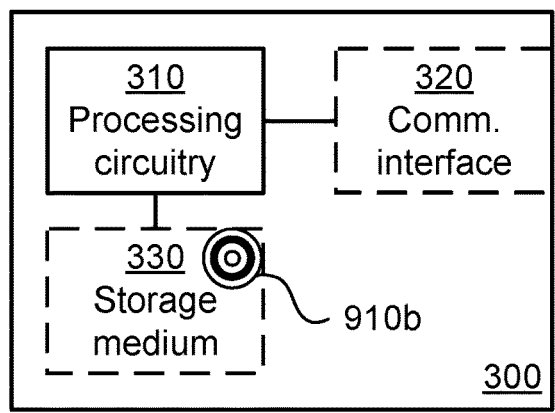
FIG. 7 is a schematic diagram showing functional units of an application server according to an embodiment.

FIG. 7 schematically illustrates, in terms of a number of functional units, the components of an application server 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 910b (as in FIG. 9), e.g. in the form of a storage medium 330. The processing circuitry 310 may further be provided as at least one application specific integrated circuit (ASIC), or field programmable gate array (FPGA).

Particularly, the processing circuitry 310 is configured to cause the application server 300 to perform a set of operations, or steps, as disclosed above. For example, the storage medium 330 may store the set of operations, and the processing circuitry 310 may be configured to retrieve the set of operations from the storage medium 330 to cause the application server 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The application server 300 may further comprise a communications interface 320 for communications with other entities, functions, nodes, and devices, as in FIG. 1. As such the communications interface 320 may comprise one or more transmitters and receivers, comprising analogue and digital components.

The processing circuitry 310 controls the general operation of the application server 300 e.g. by sending data and control signals to the communications interface 320 and the storage medium 330, by receiving data and reports from the communications interface 320, and by retrieving data and instructions from the storage medium 330. Other components, as well as the related functionality, of the application server 300 are omitted in order not to obscure the concepts presented herein.

Figure 8:
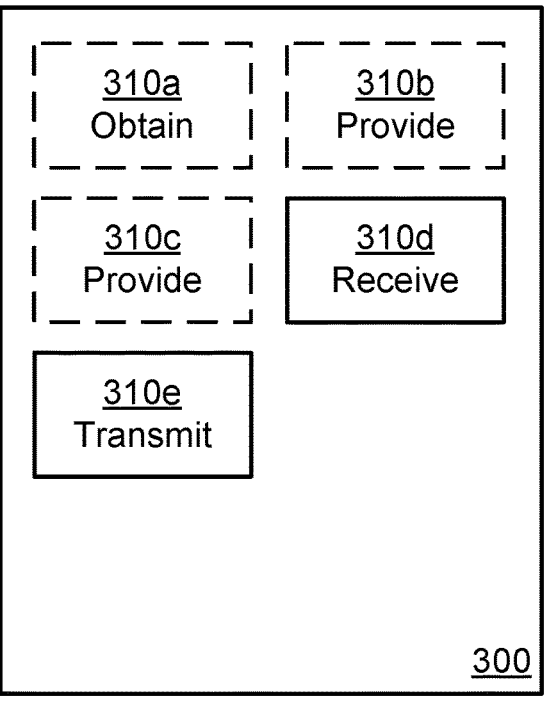
FIG. 8 is a schematic diagram showing functional modules of an application server according to an embodiment.

FIG. 8 schematically illustrates, in terms of a number of functional modules, the components of an application server 300 according to an embodiment. The application server 300 of FIG. 8 comprises a number of functional modules; a receive module 310d configured to perform step S208, and a transmit module 310e configured to perform step S210. The application server 300 of FIG. 8 may further comprise a number of optional functional modules, such as any of an obtain module 310a configured to perform step S202, a first provide module 310b configured to perform step S204, and a provide obtain module 310c configured to perform step S206. In general terms, each functional module 310a: 310e may be implemented in hardware or in software. Preferably, one or more or all functional modules 310a: 310e may be implemented by the processing circuitry 310, possibly in cooperation with the communications interface 320 and/or the storage medium 330. The processing circuitry 310 may thus be arranged to from the storage medium 330 fetch instructions as provided by a functional module 310a: 310e and to execute these instructions, thereby performing any steps of the application server 300 as disclosed herein.

The application server 300 may be provided as a stand-alone device or as a part of at least one further device. Thus, a first portion of the instructions performed by the application server 300 may be executed in a first device, and a second portion of the instructions performed by the application server 300 may be executed in a second device; the herein disclosed embodiments are not limited to any particular number of devices on which the instructions performed by the application server 300 may be executed. Hence, the methods according to the herein disclosed embodiments are suitable to be performed by a application server 300 residing in a cloud computational environment. Therefore, although a single processing circuitry 310 is illustrated in FIG. 7 the processing circuitry 310 may be distributed among a plurality of devices, or nodes. The same applies to the functional modules 310a: 310e of FIG. 8 and the computer program 920b of FIG. 9.

Figure 9:
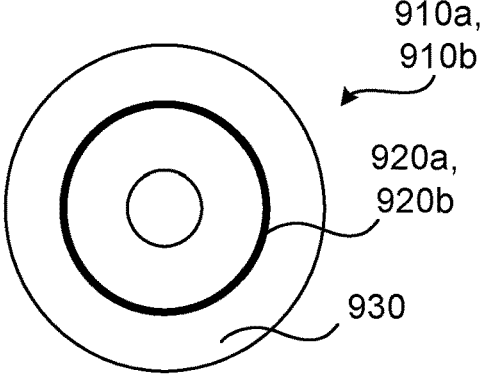
FIG. 9 shows one example of a computer program product comprising computer readable means according to an embodiment.

FIG. 9 shows one example of a computer program product 910a, 910b comprising computer readable means 930. On this computer readable means 930, a computer program 920a can be stored, which computer program 920a can cause the processing circuitry 210 and thereto operatively coupled entities and devices, such as the communications interface 220 and the storage medium 230, to execute methods according to embodiments described herein. The computer program 920a and/or computer program product 910a may thus provide means for performing any steps of the wireless device 200 as herein disclosed. On this computer readable means 930, a computer program 920b can be stored, which computer program 920b can cause the processing circuitry 310 and thereto operatively coupled entities and devices, such as the communications interface 320 and the storage medium 330, to execute methods according to embodiments described herein. The computer program 920b and/or computer program product 910b may thus provide means for performing any steps of the application server 300 as herein disclosed.

In the example of FIG. 9, the computer program product 910a, 910b is illustrated as an optical disc, such as a CD (compact disc) or a DVD (digital versatile disc) or a Blu-Ray disc. The computer program product 910a, 910b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920a, 920b is here schematically shown as a track on the depicted optical disk, the computer program 920a, 920b can be stored in any way which is suitable for the computer program product 910a, 910b.

The wireless device 200, when in the form of an IoT device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot.

A wireless device 200 of FIG. 5 in the form of an IoT device comprises circuitry and/or software in dependence of the intended application of the IoT device in addition to other components as described in relation to FIG. 5.

As yet another specific example, in an IoT scenario, a wireless device 200 may represent a machine or other device that performs operations such as measurements, and transmits the results of such measurements to another wireless device 200 and/or a network node. The wireless device 200 may in this case be a machine to machine (M2M) device, which in a 3rd Generation Partnership Project (3GPP) context may be referred to as a Machine-Type Communication (MTC) device. As one particular example, the wireless device 200 may implement the 3GPP NB-IoT standard (where NB-IoT is short for narrowband-IoT). In other scenarios, a wireless device 200 may represent a vehicle, such as a car, a bus, a truck, a ship and an airplane, or other equipment that is capable of reporting on its operational status or other functions associated with its operation.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for tracing operations in a network, the method being performed by a wireless device operatively connected to the network, the method comprising:

performing an operation with respect to a piece of data, the piece of data being associated with an application run in the network;

tracing the operation in a trace instance, where the trace instance comprises an identifier of a span of the trace instance, an initial timestamp from when the span was originally created, and a reference to another span of the trace instance; and transmitting a constrained application protocol, CoAP, message to an application server of the application, where the CoAP message has a header part and a payload part, and where the payload part comprises the trace instance.

2. The method according to claim 1, wherein the method further comprises:

obtaining an observe request from the application server, the observe request indicating to the wireless device to include the trace instance in the CoAP message.

3. The method according to claim 1, wherein the method further comprises:

obtaining a trigger request from the application server, the trigger request indicating to the wireless device to start performing the operation with respect to the piece of data.

4. The method according to claim 3, wherein the trigger request comprises a header, and wherein the header comprises a token.

5. The method according to claim 4, wherein the token comprises an identifier of the trace instance and the reference to said another span.

6. The method according to claim 1, wherein the trace instance is an Internet Protocol for Smart Objects, IPSO, object.

7. The method according to claim 1, wherein the trace instance is defined by a directed acyclic graph of the span and said another span.

8. A method for tracing operations in a network, the method being performed by an application server, the method comprising:

receiving a constrained application protocol, CoAP, message from a wireless device operatively connected to the network, where the CoAP message has a header part and a payload part, and where the payload part comprises a trace instance for tracing operations performed by the wireless device with respect to a piece of data, where the trace instance comprises an identifier of a span of the trace instance, an initial timestamp from when the span was originally created, and a reference to another span of the trace instance; and transmitting, to a tracing collector, trace and span information defined by the identifier of the span, the initial timestamp, and the reference.

9. The method according to claim 8, wherein the method further comprises:

providing an observe request to the wireless device, the observe request indicating to the wireless device to include the trace instance in the CoAP message.

10. The method according to claim 8, wherein the method further comprises:

providing a trigger request to the wireless device, the trigger request indicating to the wireless device to start performing an operation with respect to the piece of data.

11. A wireless device for tracing operations in a network, the wireless device being configured to connect to the network, the wireless device comprising processing circuitry, the processing circuitry being configured to cause the wireless device to:

perform an operation with respect to a piece of data, the piece of data being associated with an application run in the network;

trace the operation in a trace instance, where the trace instance comprises an identifier of a span of the trace instance, an initial timestamp from when the span was originally created, and a reference to another span of the trace instance; and transmit a constrained application protocol, CoAP, message to an application server of the application, where the CoAP message has a header part and a payload part, and where the payload part comprises the trace instance.

12. The wireless device according to claim 11, further being configured to:

obtain an observe request from the application server, the observe request indicating to the wireless device to include the trace instance in the CoAP message.

13. The wireless device according to claim 11, further being configured to:

obtain a trigger request from the application server, the trigger request indicating to the wireless device to start performing the operation with respect to the piece of data.

14. The wireless device according to claim 11, wherein the trigger request comprises a header, and wherein the header comprises a token.

15. The wireless device according to claim 11, wherein the token comprises an identifier of the trace instance and the reference to said another span.

16. The wireless device according to claim 11, wherein the trace instance is an Internet Protocol for Smart Objects, IPSO, object.

17. The wireless device according to claim 11, wherein the trace instance is defined by a directed acyclic graph of the span and said another span.

18. An application server for tracing operations in a network, the application server comprising processing circuitry, the processing circuitry being configured to cause the application server to:

receive a constrained application protocol, CoAP, message from a wireless device operatively connected to the network, where the CoAP message has a header part and a payload part, and where the payload part comprises a trace instance for tracing operations performed by the wireless device with respect to a piece of data, where the trace instance comprises an identifier of a span of the trace instance, an initial timestamp from when the span was originally created, and a reference to another span of the trace instance; and transmit trace and span information defined by the identifier of the span, the initial timestamp, and the reference to a tracing collector.

19. The application server according to claim 18, further being configured to:

provide an observe request to the wireless device, the observe request indicating to the wireless device to include the trace instance in the CoAP message.

20. The application server according to claim 18, further being configured to:

provide a trigger request to the wireless device, the trigger request indicating to the wireless device to start performing an operation with respect to the piece of data.

* * * * *